(12) United States Patent
Lee et al.

(10) Patent No.: US 9,369,690 B2
(45) Date of Patent: Jun. 14, 2016

(54) APPARATUS AND METHOD FOR GENERATING 3D IMAGE DATA IN A PORTABLE TERMINAL

(75) Inventors: Gun-Ill Lee, Seoul (KR); Ha-Joong Park, Suwon-si (KR); Yong-Tae Kim, Seoul (KR); Houng-Sog Min, Ansan-si (KR); Sung-Bin Hong, Yongin-si (KR); Kwang-Cheol Choi, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 706 days.

(21) Appl. No.: 13/580,861

(22) PCT Filed: Feb. 23, 2011

(86) PCT No.: PCT/KR2011/001269
§ 371 (c)(1),
(2), (4) Date: Aug. 23, 2012

(87) PCT Pub. No.: WO2011/105812
PCT Pub. Date: Sep. 1, 2011

(65) Prior Publication Data
US 2012/0314033 A1    Dec. 13, 2012

(30) Foreign Application Priority Data

Feb. 23, 2010  (KR) .................. 10-2010-0016151
Feb. 18, 2011  (KR) .................. 10-2011-0014557

(51) Int. Cl.
*G06K 9/00*    (2006.01)
*H04N 13/00*   (2006.01)
*H04N 13/02*   (2006.01)

(52) U.S. Cl.
CPC ....... *H04N 13/0055* (2013.01); *H04N 13/0066* (2013.01); *H04N 13/0203* (2013.01)

(58) Field of Classification Search
CPC . G06K 9/00; H04N 13/0055; H04N 13/0203; H04N 13/0066
See application file for complete search history.

(56) References Cited

U.S. PATENT DOCUMENTS 5,625,408 A     4/1997   Matsugu et al.
6,492,986 B1 *  12/2002  Metaxas et al. ............... 345/420
(Continued)

FOREIGN PATENT DOCUMENTS

JP     07-98215     4/1995
JP     7-292259     10/1995
(Continued)

OTHER PUBLICATIONS

Extended European Search Report issued in Application No. 11747702.6 dated Jul. 23, 2013.
(Continued)

*Primary Examiner* — Gregory M Desire
(74) *Attorney, Agent, or Firm* — Staas & Halsey LLP

(57) ABSTRACT

The present invention relates to an apparatus and a method for processing three-dimensional (3D) image data of a portable terminal, and particularly, to an apparatus and a method for enabling contents sharing and reproduction (playback) between various 3D devices using a file structure for effectively storing a 3D image obtained using a plurality of cameras, and a stored 3D related parameter, and sharing and reproduction between various 3D devices are possible using a file structure for effectively storing a 3D image (for example, a stereo image) obtained using a plurality of cameras, and a stored 3D related parameter.

18 Claims, 9 Drawing Sheets

(56) References Cited

U.S. PATENT DOCUMENTS

| | | | |
|---|---|---|---|
| 6,606,406 B1* | 8/2003 | Zhang et al. | 382/154 |
| 6,678,394 B1* | 1/2004 | Nichani | 382/103 |
| 6,901,209 B1* | 5/2005 | Cooper et al. | 386/294 |
| 7,082,441 B1* | 7/2006 | Zahavi et al. | |
| 7,111,142 B2* | 9/2006 | Spencer et al. | 711/170 |
| 7,538,876 B2* | 5/2009 | Hewitt et al. | 356/364 |
| 2001/0031132 A1* | 10/2001 | Shirakawa | G11B 20/1217 386/290 |
| 2005/0129281 A1* | 6/2005 | Ashizaki | G03H 1/268 382/112 |
| 2005/0131562 A1* | 6/2005 | Kang | H04S 3/002 700/94 |
| 2006/0126919 A1* | 6/2006 | Kitaura | H04N 13/0018 382/154 |
| 2006/0209183 A1 | 9/2006 | Mashitani et al. | |
| 2007/0092161 A1* | 4/2007 | Aratani et al. | 382/286 |
| 2007/0118550 A1* | 5/2007 | Yang | G06F 19/321 |
| 2009/0295790 A1* | 12/2009 | Pockett | 345/419 |
| 2010/0138478 A1* | 6/2010 | Meng | H04N 5/44591 709/203 |
| 2012/0314033 A1* | 12/2012 | Lee et al. | 348/46 |

FOREIGN PATENT DOCUMENTS

| | | |
|---|---|---|
| JP | 2003-284095 | 10/2003 |
| JP | 2003-284095 A | 10/2003 |
| JP | 2004-336701 | 11/2004 |
| JP | 2004-336701 A | 11/2004 |
| JP | 2006-013759 | 1/2006 |
| JP | 2006 013851 A | 1/2006 |
| JP | 2008-172342 | 7/2008 |
| JP | 2008 172342 | 7/2008 |
| JP | 2008-310187 | 12/2008 |
| JP | 2008-311943 | 12/2008 |
| JP | 2009-49509 | 3/2009 |
| KR | 10-0641176 | 10/2006 |
| KR | 100653965 | 11/2006 |
| KR | 10-0744800 | 7/2007 |
| KR | 1020090081190 | 7/2009 |

OTHER PUBLICATIONS

Search Report, PCT/ISA/210 dated Oct. 31, 2011 in PCT Patent Application No. PCT/KR2011/001269.
Written Opinion, PCT/ISA/237 dated Oct. 31, 2011 in PCT Patent Application No. PCT/KR2011/001269.
Japanese Office Action dated Jan. 26, 2015 in corresponding Japanese Patent Application No. 2012-554927.
European Office Action dated Jun. 2, 2015 issued in corresponding European Patent Application 11 747 702.6.
Japanese Decision on Grant issued Nov. 20, 2015 in corresponding Japanese Patent Application 2012-554927.
European Office Action issued Dec. 21, 2015 in corresponding European Patent Application 11 747 702.6.

* cited by examiner

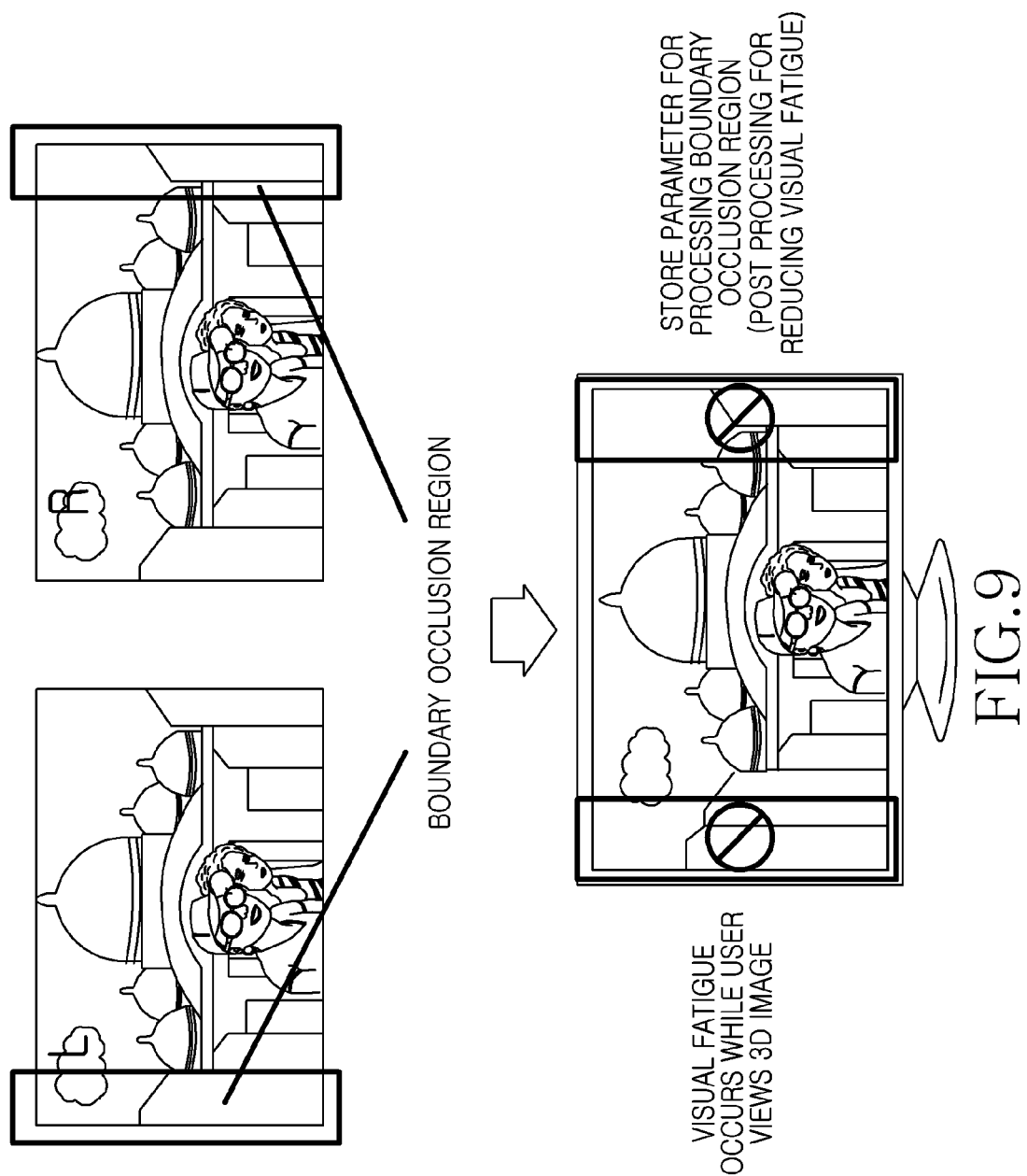

APPARATUS AND METHOD FOR GENERATING 3D IMAGE DATA IN A PORTABLE TERMINAL

BACKGROUND OF THE INVENTION

The present invention relates to an apparatus and a method for processing three-dimensional (3D) image data of a mobile terminal. More particularly, the present invention relates to an apparatus and a method for enabling contents sharing and reproduction between various 3D devices using a file structure for efficiently storing 3D image data obtained using a plurality of cameras and a stored 3D related parameter.

A recent image technology is in active progress in a direction of a study regarding a method for realizing a 3D image. This is for expressing more realistic image information having a sense of reality. A method of scanning a left visual point image and a right visual point image on relevant positions of an existing display device, respectively, using a characteristic of a human visual sense, and then allowing the left visual point image and the right visual point image to be separated and focused on a user's left eye and right eye, respectively, thereby allowing the user to feel a 3D effect is obtaining its possibility in various aspects. For example, a mobile terminal (a 3D mobile phone, a 3D camera, a 3D camcorder, etc.) and a 3D TV mounting a barrier LCD thereon may reproduce stereoscopic contents to provide a more realistic image to a user.

FIG. 1 is a view illustrating a structure of an image file used by a general mobile terminal.

Referring to FIG. 1, the image file is a JPEG file, which is a still image store file format generally used much, starting with a Start of Image (SOI) marker 101 and ending with End of Image (EOI) marker 107. APP1 (EXIF) application marker 103 storing additional information of an image exists in the intermediate portion, and a Minimum Coded Unit (MCU) data portion 105, which is compression data of an actual image, is included. The application marker portion 103 is an additional field currently defined from APP0 to APP15, where a camera manufacturer or a related viewer company defines and uses necessary parameters in its own way.

To provide a 3D effect using image files shot by a plurality of cameras, a plurality of image files having the above structure should be stored. For example, in case of stereo image data shot by two cameras, relevant two files should be generated, respectively. In this case, information regarding connection relation between the two files should be stored. In the case where one file is deleted or a filename is modified, a device cannot reproduce the image as a 3D image.

That is, since a store file format regarding an image obtained by a plurality of cameras and a file structure for storing 3D related parameters are not defined in the conventional art, it is impossible to share and reproduce contents between various 3D devices.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for generating 3D image data in a mobile terminal.

Another aspect of the present invention is to provide an apparatus and a method for generating 3D image data having high compatibility between different multimedia devices in a mobile terminal.

Still another aspect of the present invention is to provide an apparatus and a method for processing a boundary occlusion region for reducing a visual fatigue in a mobile terminal.

In accordance with an aspect of the present invention, an apparatus for generating three dimensional (3D) data in a mobile terminal is provided. The apparatus includes a camera unit for obtaining a plurality of multimedia data capable of providing a 3D effect, and a 3D data manager for obtaining a 3D parameter of the obtained multimedia data, compressing the obtained multimedia data, and generating the obtained 3D parameter and the compressed data as one file.

In accordance with another aspect of the present invention, an apparatus for generating three dimensional (3D) data in a mobile terminal is provided. The apparatus includes a 3D data manager for analyzing a 3D parameter of 3D data to reproduce, analyzing a plurality of visual points included in the 3D data based on the analyzed parameter, and reproducing the analyzed plurality of visual points to provide a 3D effect.

In accordance with still another aspect of the present invention, a method for generating three dimensional (3D) data in a mobile terminal is provided. The method includes obtaining a plurality of multimedia data capable of providing a 3D effect, obtaining a 3D parameter of the obtained multimedia data, compressing the obtained multimedia data, and generating the obtained 3D parameter and the compressed data as one file.

In accordance with further another aspect of the present invention, a method for reproducing three dimensional (3D) data in a mobile terminal is provided. The method includes analyzing a 3D parameter of 3D data to reproduce, analyzing a plurality of visual points included in the 3D data based on the analyzed parameter, and reproducing the analyzed plurality of visual points to provide a 3D effect.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 9 is a view illustrating a process for reproducing 3D data in a mobile terminal according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for generating and reproducing 3D data in which data (for example, stereo image) shot by a plurality of cameras are stored as one file. Also, the mobile terminal denotes a display device producing stereoscopic contents to provide a 3D effect to a user such as a 3D mobile communication terminal mounting a barrier LCD, a 3D camera, a 3D camcorder, a 3D TV, etc.

Figure 1:
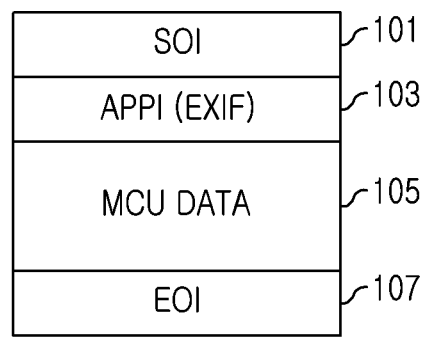
FIG. 1 is a view illustrating a structure of an image file used by a general mobile terminal.
Figure 2:
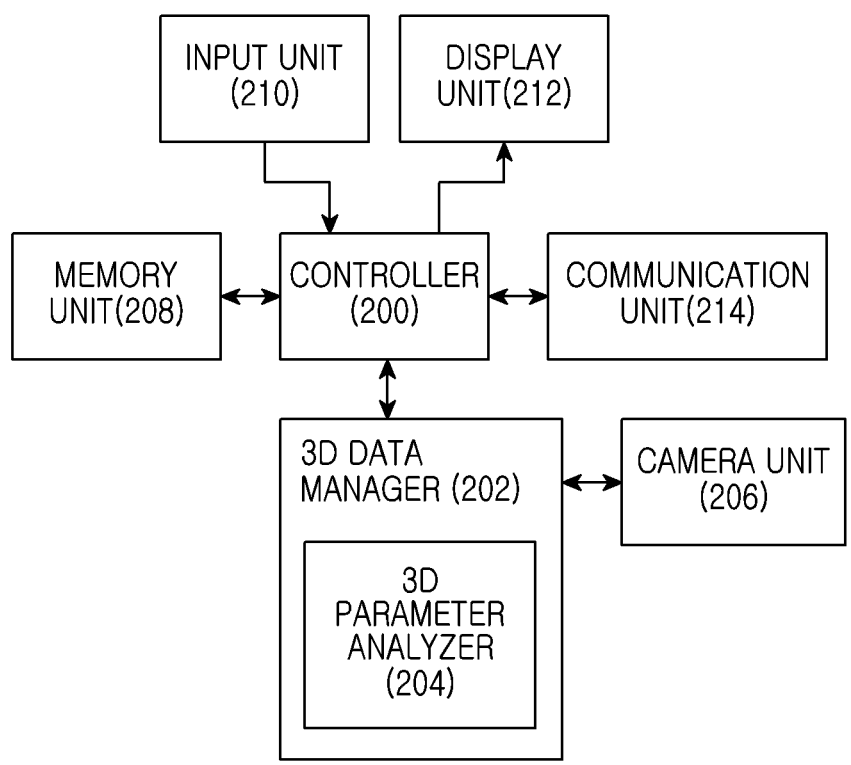
FIG. 2 is a block diagram illustrating a mobile terminal controlling 3D data according to an exemplary embodiment of the present invention.

FIG. 2 is a block diagram illustrating a mobile terminal controlling 3D data according to an exemplary embodiment of the present invention.

Referring to FIG. 2, the mobile terminal may include a controller 200, a 3D data manager 202, a camera unit 206, a memory unit 208, an input unit 210, a display unit 212, and a communication unit 214. The 3D data manager 202 may include a 3D parameter analyzer 204.

First, the controller 200 of the mobile terminal controls an overall operation of the mobile terminal. For example, the controller 200 performs a process and a control for voice communication and data communication. In addition to the general function, according to the present invention, the controller 200 merges a plurality of data providing a 3D effect as one file to generate 3D data, and reproduces the 3D data generated as one file to provide a 3D effect.

At this point, when reproducing the 3D data, the controller 200 processes to reproduce relevant data while reducing a user's visual fatigue.

The 3D data manager 202 processes to merge a plurality of data providing a 3D effect as one file and generate 3D data under control of the controller 200. At this point, the 3D data manager 202 generates information regarding a 3D parameter with respect to the data and then compresses the data. After that, the 3D data manager 202 merges a 3D parameter of respective data and the compressed data as one file.

Also, when reproducing the 3D data merged as one file, the 3D data manager 202 analyzes the 3D parameter information and reproduces the 3D data based on the analyzed 3D parameter. At this point, the 3D data manager 202 processes to reproduce the 3D data while raising a 3D effect or reducing a visual fatigue by the 3D effect depending on a display size of a terminal which intends to reproduce the 3D data.

For example, in the case where a terminal which intends to reproduce the 3D data has a large-sized display, the 3D data manager 202 reproduces data obtained at a close distance from reference data to reduce a visual fatigue. In the case where a terminal which intends to reproduce the 3D data has a small-sized display, the 3D data manager 202 reproduces data obtained at a far distance from the reference data to raise a 3D effect.

Also, the 3D data manager 202 reproduces 3D data while removing a boundary occlusion region existing in a specific region of data obtained via two cameras located apart by a predetermined distance, thereby reducing a user's visual fatigue.

The 3D parameter analyzer 204 of the 3D data manager 202 analyzes a parameter of a plurality of data providing a 3D effect when generating the 3D data, and detects the number of visual points NumofStereoPair included in the data, an index PairedView[ ] of a visual point forming a stereo paring with a current visual point, a width of a boundary occlusion BoundaryOccludedWidth of a current visual point compared to a reference visual point, and a direction OcclusionDirection in which the boundary occlusion occurs when generating the 3D data to reduce a user's visual fatigue.

The camera unit 206 denotes cameras shooting the same object at a different angle. A main camera and a sub camera are provided at positions separated by a predetermined distance.

The memory unit 208 includes Read Only Memory (ROM), Random Access Memory (RAM), and a flash ROM. The ROM stores microcodes of a program for processes and controls of the controller 200 and the 3D data manager 202, and various reference data.

The RAM serves as a working memory of the controller 200 and stores temporary data occurring during execution of various programs. Also, the flash ROM stores various updatable data for storage such as a phonebook, calling messages, and received messages.

The input unit 210 has a plurality of function keys such as numerical key buttons of 0 to 9, a menu button, a cancel button, an OK button, a TALK button, an END button, an Internet access button, navigation key (or directional key) buttons, letter input keys, etc., and provides key input data corresponding to a key pressed by a user to the controller 200.

The display unit 212 displays status information generated during an operation of the mobile terminal, a limited number of characters, a large amount of moving images and still images, etc. The display unit 212 may be a color Liquid Crystal Display (LCD). The display unit 212 may include a touch input device, and when it is applied to a touch input type mobile terminal, it can be used as an input unit.

The communication unit 214 transmits/receives a Radio Frequency (RF) signal of data input/output via an antenna (not shown). For example, during transmission, the communication unit 214 channel-codes and spreads data to be transmitted, and then performs an RF process on the signal to transmit the signal. During reception, the communication unit 214 converts a received RF signal into a baseband signal, and despreads and channel-decodes the baseband signal to recover data.

The function of the 3D data manager 202 may be performed by the controller 200 of the mobile terminal. The separate configuration and illustration of the 3D data manager 202 are an exemplary purpose only for inconvenience in description, not for limiting the scope of the present invention. It would be obvious to those skilled in the art that various modifications may be made within the scope of the present invention. For example, all functions of the 3D data manager 202 may be processed by the controller 200.

Up to now, an apparatus for generating and reproducing 3D data in which data (for example, stereo images) shot by a plurality of cameras are stored as one file in a mobile terminal according to the present invention has been described. Hereinafter, a method for generating and reproducing 3D data using the above apparatus according to the present invention is described.

Figure 3:
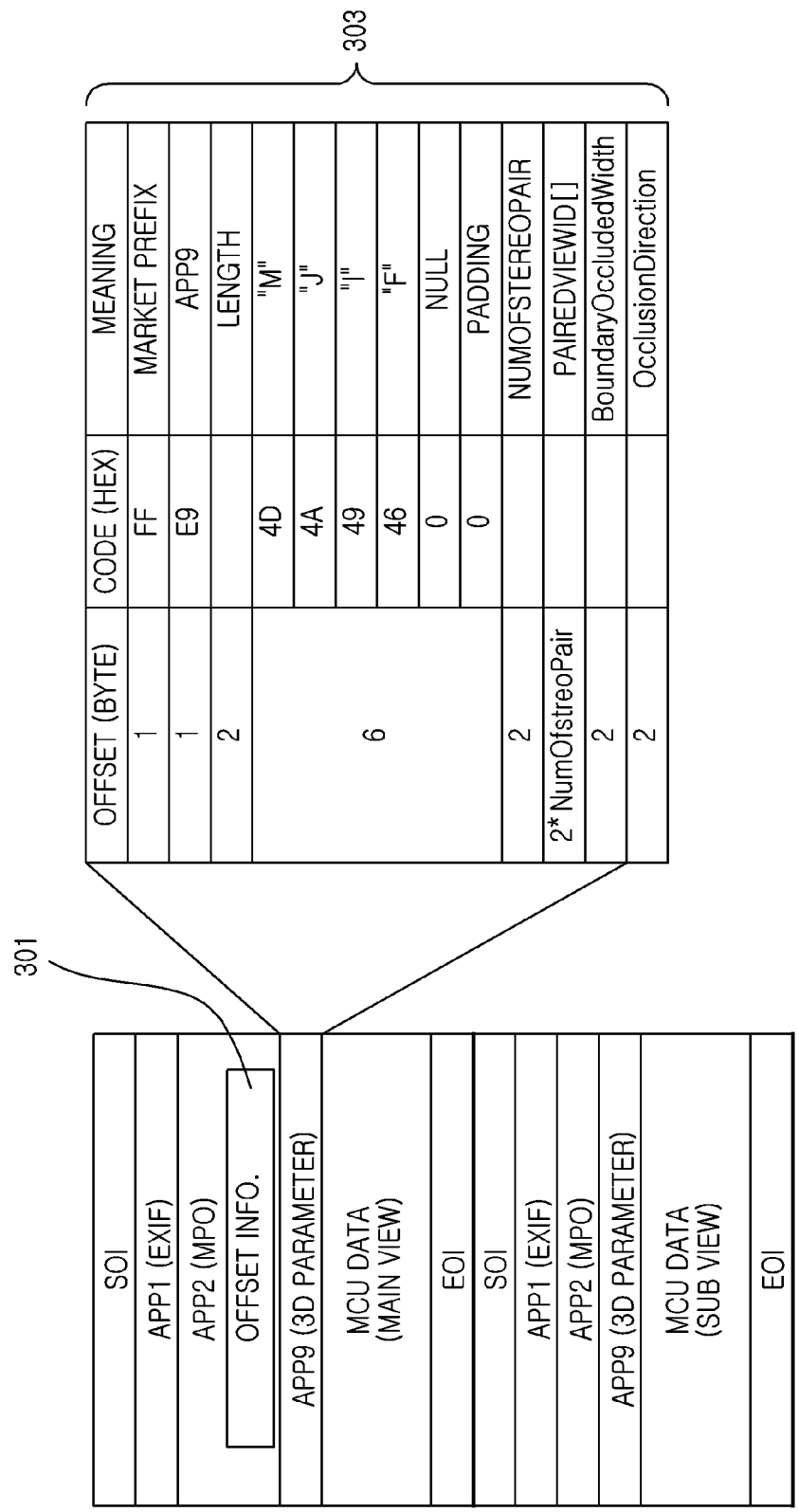
FIG. 3 is a view illustrating construction of 3D data that uses two image data according to an exemplary embodiment of the present invention.
Figure 4:
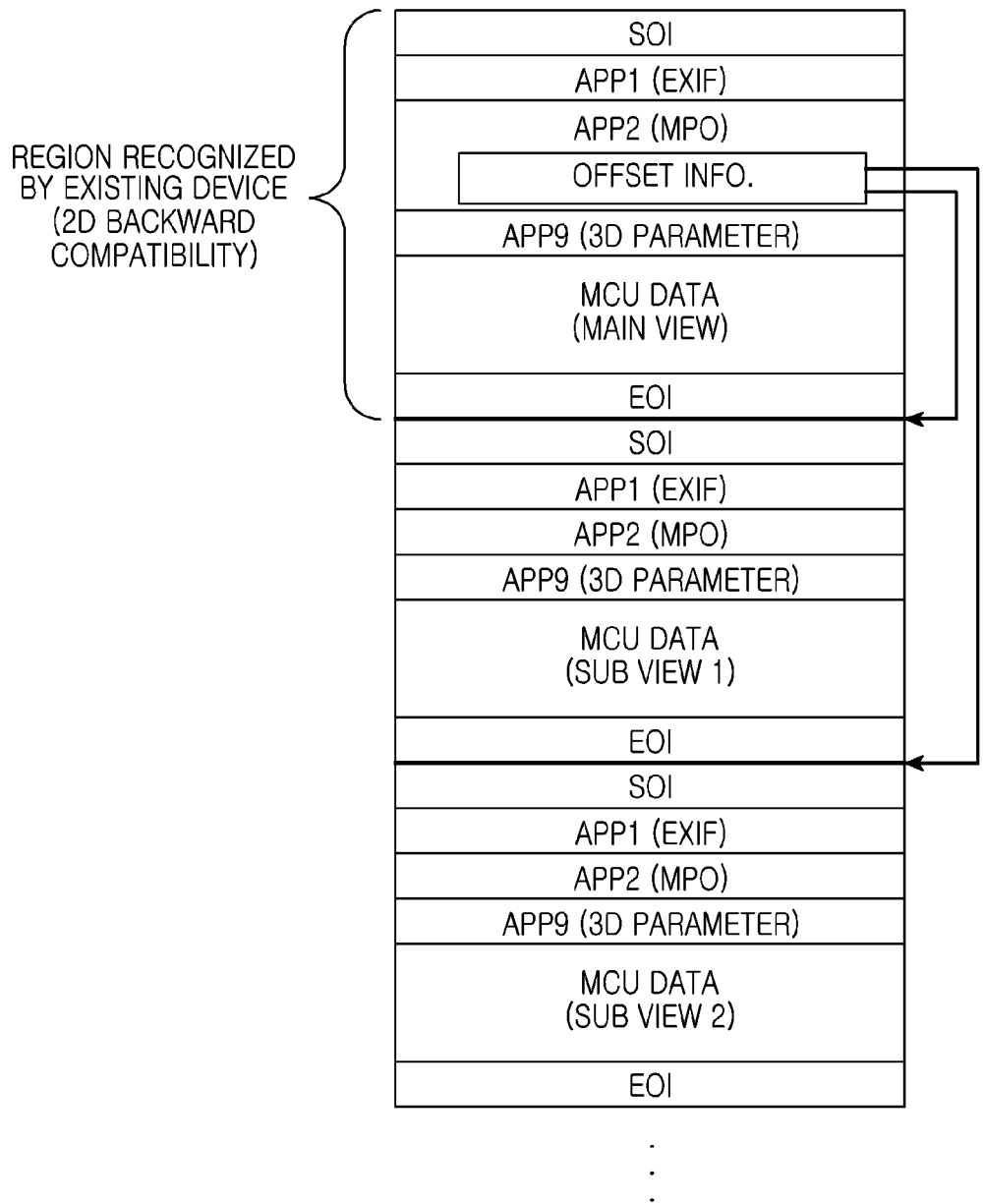
FIG. 4 is a view illustrating construction of 3D data that uses three image data according to an exemplary embodiment of the present invention.

FIGS. 3 and 4 are views illustrating construction of 3D data according to an exemplary embodiment of the present invention.

FIG. 3 illustrates construction of the 3D data that uses two image data (stereo image data) according to an exemplary embodiment of the present invention.

Referring to FIG. 3, a general mobile terminal that cannot reproduce 3D data can reproduce only data obtained using a main camera among data included in the 3D data.

To raise 2D backward compatibility for the 3D data in the general mobile terminal, the 3D data is configured such that data (for example, a right visual point image) obtained via an auxiliary camera is disposed behind data (for example, a left visual point image) obtained using the main camera.

Also, the 3D data includes an APP1 marker region and an MCU Data portion. According to an exemplary embodiment of the present invention, an APP2 marker region including Offset information 301 for decoding the MCU Data, and an APP9 marker region 303 for storing meta data for 3D data may be added. Here, the Offset information 301 for decoding the MCU Data denotes a start address of a block where image data for a plurality of visual points are separated and stored and information regarding a size of image data for a plurality of visual points. Meta data for the 3D data denoted by 303 may be defined as in Table 1 below.

| Syntax | Semantics |
| --- | --- |
| NumofStereoPair | Number of total visual points which are stereo pairing with current visual point |
| PairedViewID[ ] | Indexes of visual points which are stereo pairing with current visual point<br>ID order is determined according to disparity (order of less 3D effect) |
| BoundaryoccludedWidth | Width of Occulusion area of current image with reference visual point (valid in only stereo image) |
| OcculusionDirection | Direction of Occulusion area generation<br>0: left boundary area of image<br>1: left boundary area of image |

Though the present invention has defined the meta data for the 3D data in APP9 and used the same, an application marker is a field defined and used by various companies in their own way. Since when only an identifier field of an application marker region is changed, the 3D data may be discriminated from each other, any of APP0 to APP15 may be designated though APP9 has been exemplarily used here.

In the case where an existing 2D mobile terminal reproduces 3D data stored in the above structure, the 2D mobile terminal reproduces only data obtained via a main camera and a 3D mobile terminal recognizes data obtained via an auxiliary camera to reproduce the data in a 3D manner.

FIG. 4 is a view illustrating construction of 3D data that uses three image data according to an exemplary embodiment of the present invention.

Referring to FIG. 4, the 3D data may be configured in the above-described form.

However, the 3D data is data in which three image data have been merged as one, and an APP2 marker region including Offset information for decoding three MCU data and an APP9 marker region for storing meta data regarding the three data may be added.

Figure 5:
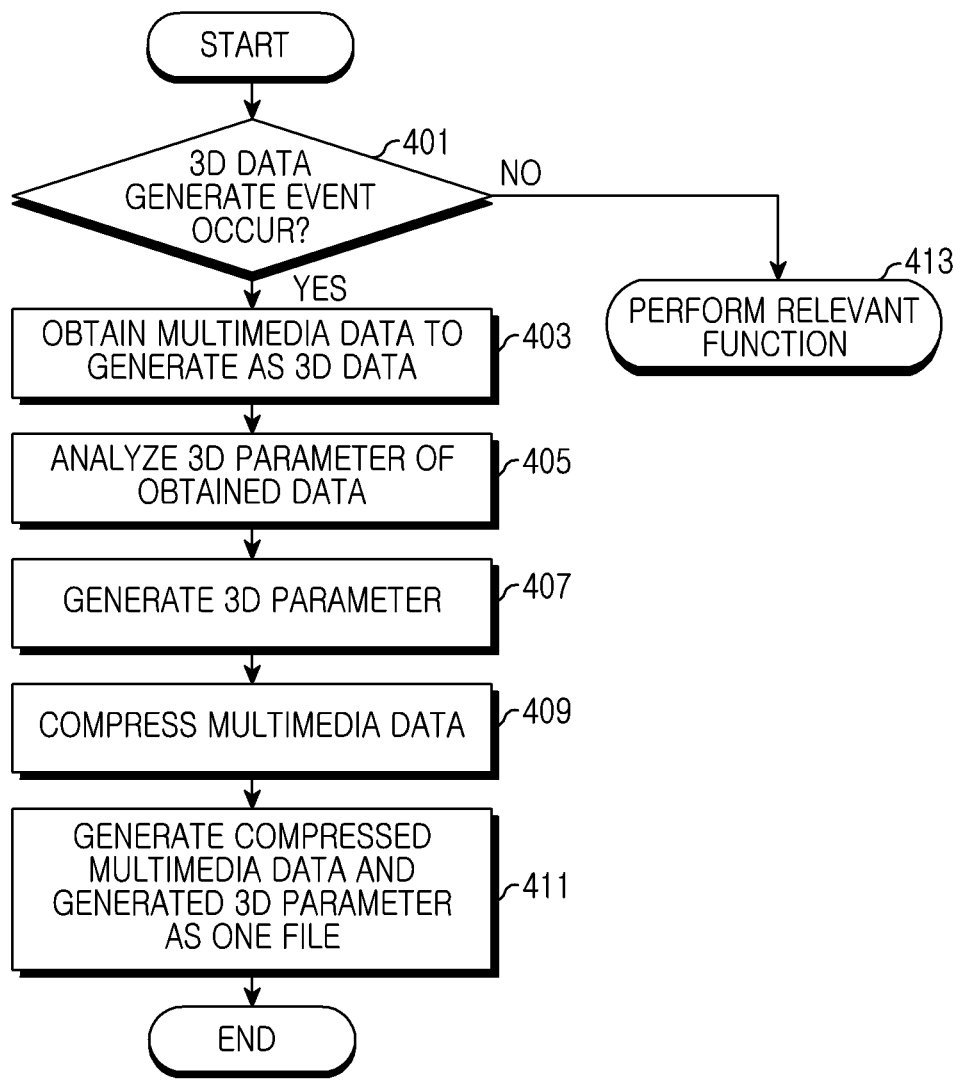
FIG. 5 is a flowchart for generating 3D data in a mobile terminal according to an exemplary embodiment of the present invention.

FIG. 5 is a flowchart for generating 3D data in a mobile terminal according to an exemplary embodiment of the present invention.

Referring to FIG. 5, the mobile terminal determines whether a 3D data generate event occurs in step 401. Here, the 3D data denotes data in which a plurality of data used for 3D reproduction are merged in the form of one file.

When the 3D data generate event does not occur in step 401, the mobile terminal proceeds to step 413 to perform a relevant function (for example, an idle mode).

In contrast, when the 3D data generate event occurs in step 401, the mobile terminal obtains multimedia data (data to use for a 3D effect) to generate as 3D data using a plurality of cameras, and proceeds to step 405 to analyze a 3D parameter of the obtained multimedia data. Here, in the case where the mobile terminal has two cameras, the mobile terminal obtains two multimedia data shot at different angles with respect to one object using the camera, and analyzes a start address of a block where each image data is to be stored and a 3D parameter in order to separate and store the obtained image data. Also, the 3D parameter denotes the number of data (the number of visual points) pairing with data serving as a reference of the obtained multimedia data, index information of the data, occlusion width information of current data compared with a reference visual point, occurrence direction information of the boundary occlusion region, etc.

For example, assuming that the mobile terminal has two cameras, the reference data becomes data obtained by the main camera, so that the number of data forming the pairing becomes "2".

Assuming that the mobile terminal has three cameras, data obtained via the main camera becomes reference data and the number of data forming the pairing becomes "3". At this point, the mobile terminal analyzes a 3D parameter between the reference data and data obtained via a second auxiliary camera, and analyzes a 3D parameter between the data obtained via the second auxiliary camera and data obtained via a third auxiliary camera.

After that, the mobile terminal proceeds to step 407 to generate the 3D parameter analyzed in step 405, and proceeds to step 409 to compress multimedia data.

After that, the mobile terminal proceeds to step 411 to generate the compressed multimedia data and the generated 3D parameter as one data.

That is, the mobile terminal obtains a plurality of image data capable of providing a 3D effect, obtains a start address of a block where each image data is to be stored and a 3D parameter in order to separate and store the image data, compresses the obtained image data, and then generates the compressed data, the 3D parameter, and the start address of the block as one file.

After that, the mobile terminal ends the present algorithm.

Figure 6:
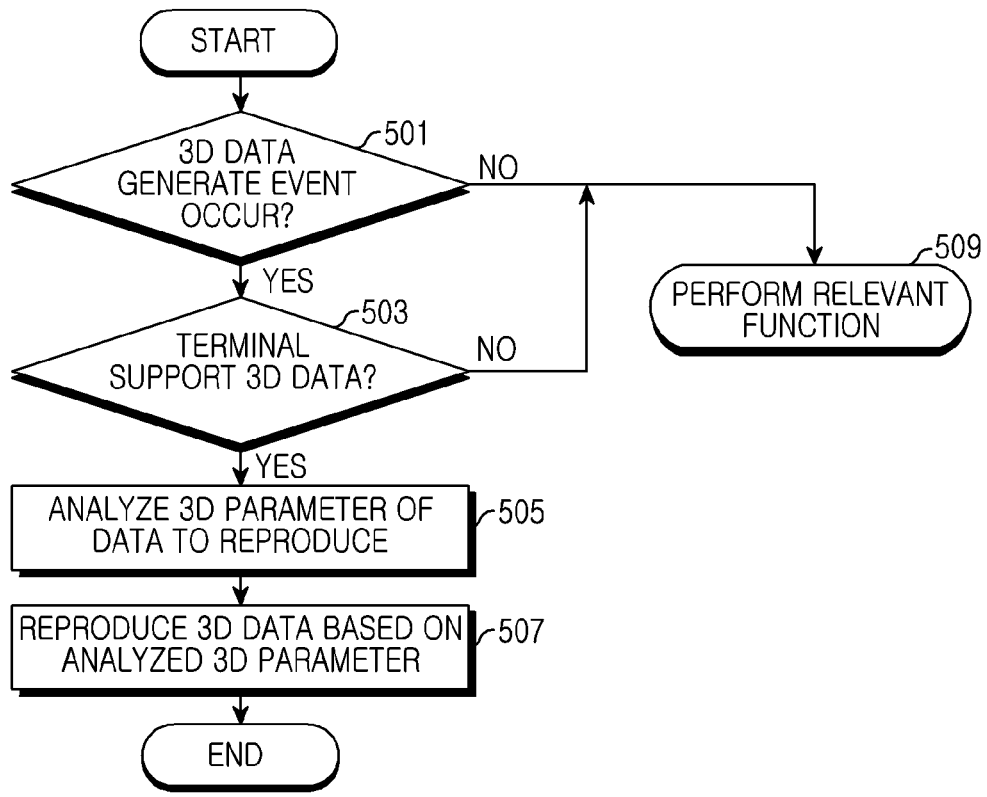
FIG. 6 is a flowchart for reproducing 3D data in a mobile terminal according to an exemplary embodiment of the present invention.

FIG. 6 is a flowchart for reproducing 3D data in a mobile terminal according to an exemplary embodiment of the present invention.

Referring to FIG. 6, the mobile terminal determines whether a 3D date reproduce event occurs in step 501.

When the 3D date reproduce event does not occur in step 501, the mobile terminal proceeds to step 509 to perform a relevant function (for example, an idle mode).

In contrast, when the 3D date reproduce event occurs in step 501, the mobile terminal proceeds to step 503 to determine whether the mobile terminal is a 3D terminal for supporting 3D data.

When determining that the mobile terminal is not the 3D terminal for supporting 3D data in step 503, the mobile terminal proceeds to step 509 to perform a relevant function (for example, reproduction of 2D data). That is, in the case where a 2D terminal reproduces the 3D data, the 2D terminal reproduces data (for example, a left visual point image) obtained via the main camera included in the 3D data. This is for raising 2D backward compatibility for the 3D data in the general mobile terminal.

In contrast, when determining that the mobile terminal is the 3D terminal for supporting 3D data in step 503, the mobile terminal proceeds to step 505 to analyze a 3D parameter of data to reproduce, and proceeds to step 507 to reproduce 3D data based on the analyzed 3D parameter. Here, step 507 is for analyzing the 3D parameter to determine the number (the number of visual points) of data forming pairing with reference data, index information of the data, width information of occlusion of current data compared with a reference visual point, and occurrence direction information of the boundary occlusion region, and then reproducing 3D data based on the determined information. A process for reproducing 3D data using the 3D parameter is described in detail with reference to FIG. 6. At this point, before analyzing a 3D parameter of the data to reproduce, the mobile terminal may determine a start address of a block where image data of a plurality of visual points are separated and stored, and then analyze a parameter of 3D data to reproduce in each block of the start address. After that, the mobile terminal determines a visual point included in the 3D data using the analyzed parameter, and reproduces the determined visual point to provide a 3D effect to the user.

After that, the mobile terminal ends the present algorithm.

Figure 7:
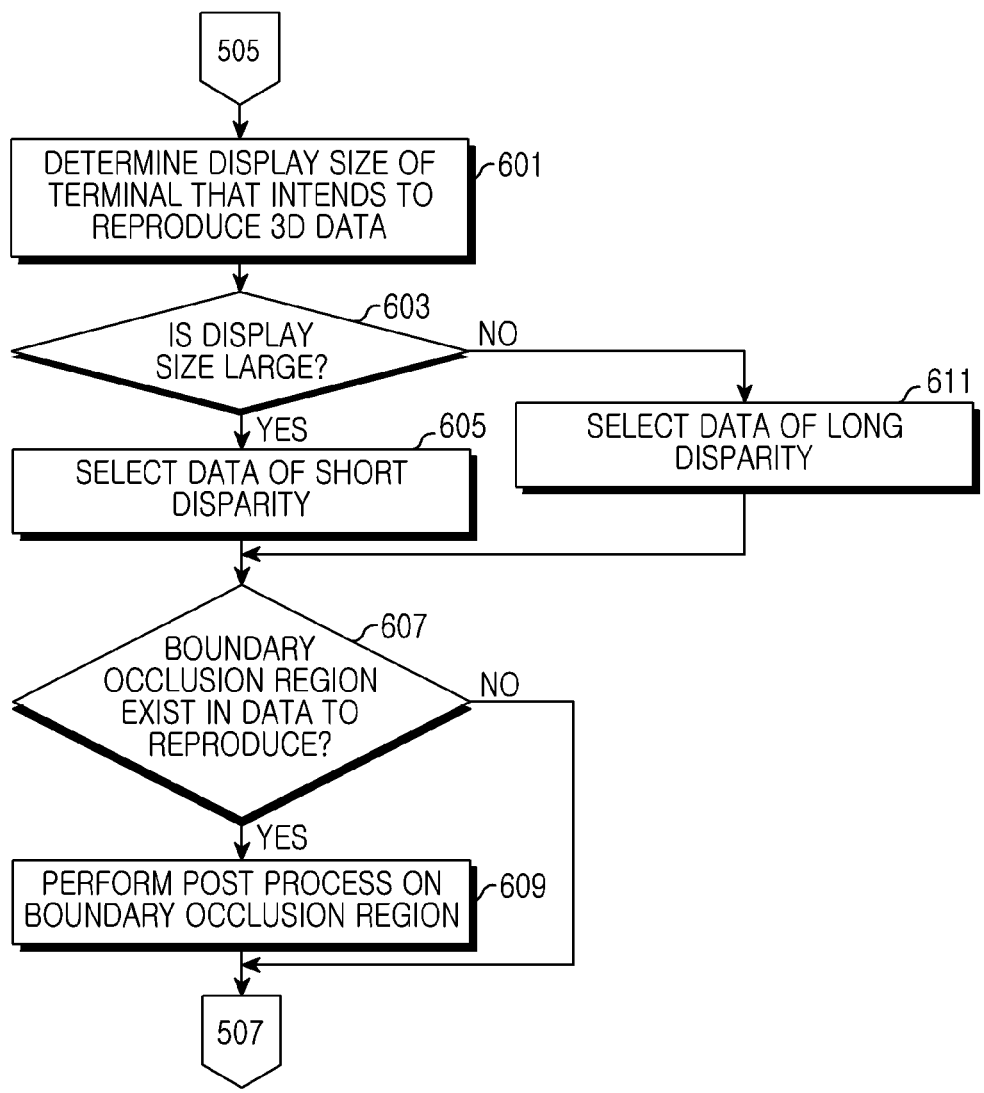
FIG. 7 is a flowchart for reproducing 3D data using a 3D parameter in a mobile terminal according to an exemplary embodiment of the present invention.

FIG. 7 is a flowchart for reproducing 3D data using a 3D parameter in a mobile terminal according to an exemplary embodiment of the present invention.

Referring to FIG. 7, the mobile terminal determines a display size of a terminal that intends to reproduce 3D data in step 601, and proceeds to step 603 to determine whether the mobile terminal has a large-sized display.

When determining that the mobile terminal has the large-sized display in step 603, the mobile terminal proceeds to step 605 to select data whose disparity with reference data (reference visual point) is short. Here, the mobile terminal may determine a distance between the reference visual point and other data using "NumofStereoPair" information representing the number of total visual points forming Stereo Pairing with a current visual point and "PairedViewID[ ]" information representing an index of a visual point forming Stereo Pairing with the current visual point among 3D parameters of the 3D data. This is for preventing an image from appearing projected forward too much and increasing a user's visual fatigue in the case where a distance between the reference visual point and other data is increased in the large-sized display.

In contrast, when determining that the mobile terminal has a small-sized display in step 603, the mobile terminal proceeds to step 611 to select data whose disparity with reference data (reference visual point) is long. This is for selecting data whose disparity with reference data (reference visual point) is long in order to improve a 3D effect of the mobile terminal having the small-sized display.

After that, the mobile terminal proceeds to step 607 to determine whether a boundary occlusion region exists in data to reproduce. Here, the boundary occlusion region is a region for increasing a visual fatigue. In case of a stereo image shot using two or more cameras, the boundary occlusion region denotes a specific region shown in only an image of each visual point. At this point, the mobile terminal may determine the boundary region using "OcclusionDirection" of a 3D parameter.

When determining that the boundary occlusion region does not exist in the data to reproduce in step 607, the mobile terminal proceeds to step 507 of FIG. 6 to reproduce 3D data based on the 3D parameter.

In contrast, when determining that the boundary occlusion region exists in the data to reproduce in step 607, the mobile terminal proceeds to step 609 to perform a post process on the existing boundary occlusion region, thereby reducing a user's visual fatigue, and then reproduce 3D data.

Figure 8:
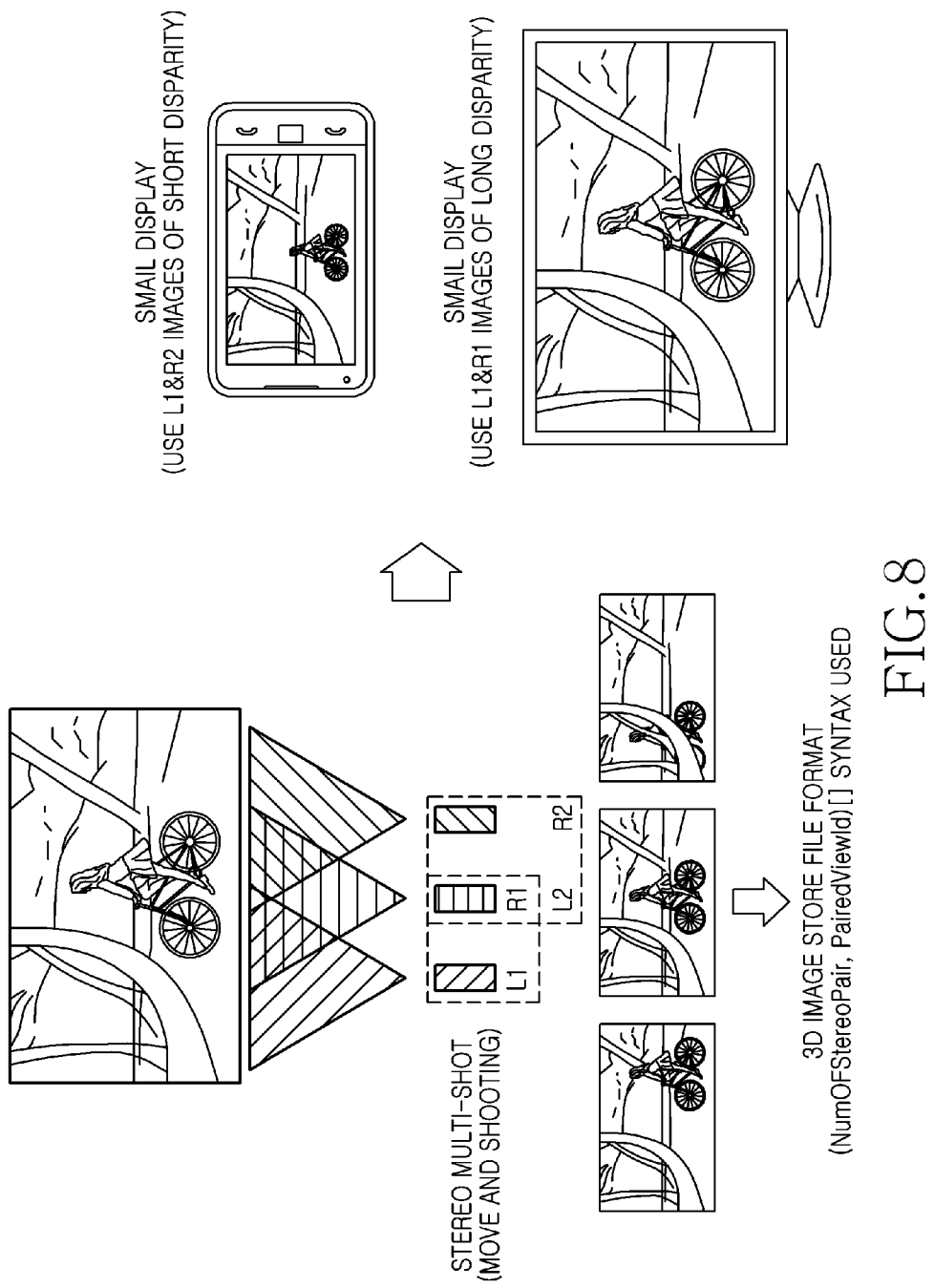
FIG. 8 is a view illustrating a process for reproducing 3D data in a mobile terminal according to an exemplary embodiment of the present invention.

FIG. 8 is a view illustrating a process for reproducing 3D data in a mobile terminal according to an exemplary embodiment of the present invention.

Referring to FIG. 8, it is assumed that the mobile terminal has two cameras and obtains three data whose disparity with a reference visual point is different using the two cameras.

That is, the mobile terminal shoots an object at one position using two cameras to obtain data (L1, R1) corresponding to left and right sides, and moves by a predetermined distance, and then obtains data (L2, R2) of the object shot via the two cameras. At this point, since a visual point for L2 and a visual point for R1 are the same, the mobile terminal obtains three data (L1, R1 or L2, R2) in total.

When disparity between data of the reference visual point and data of an additional visual point is compared in the obtained data, the data are classified into left visual point L1 data serving as a reference, R1(L2) data whose disparity is small, and R2 data whose disparity is large. The classified data are stored as 3D data having the structure of FIG. 4 according to the present invention.

At this point, the mobile terminal analyzes a 3D parameter of the data to store NumOfSterePair, PairedViewid[ ] values.

When reproducing the above generated data, the mobile terminal may change data to reproduce depending on the size of the display.

Generally, as disparity between data of the reference visual point and data of the additional visual point is large, a 3D terminal may provide a high 3D effect, but in a terminal (3D TV) having the large-sized display, as disparity between data of the reference visual point and data of the additional visual point is large, a 3D object appears projected forward too much, so that a visual fatigue increases.

Also, a terminal (a 3D camera, a mobile communication terminal) having a small-sized display cannot provide a 3D effect due to the small-sized display.

Accordingly, in case of reproducing the above-generated data, the mobile terminal having a small-sized display decodes reference visual point L1 data and R2 data whose disparity is large to reproduce 3D data, thereby improving a 3D effect. A terminal having a large-sized display such as a 3D TV decodes the reference visual point L1 data and R1 data whose disparity is small to reproduce 3D data so that a 3D effect may not be too large, thereby reducing visual fatigue.

Therefore, according to the present invention, 3D data may reproduce contents providing an effect suitable for a characteristic of a 3D terminal regardless of a display size.

FIG. 9 is a view illustrating a process for reproducing 3D data in a mobile terminal according to an exemplary embodiment of the present invention.

Referring to FIG. 9, in data shot using two cameras, a boundary occlusion region existing only in data corresponding to each visual point exists.

As illustrated, a boundary occlusion region exists in the left edge of left visual point data and the right edge of right visual point data.

Due to a characteristic of shooting an object using two cameras separated by a predetermined distance in a mobile terminal having a plurality of cameras (stereo camera), a boundary occlusion region that does not exist in the right visual point data exists in the left edge of the left visual point data, and a boundary occlusion region that does not exist in the left visual point data exists in the right edge of the right visual point data.

The above boundary occlusion region is a factor increasing a user's visual fatigue while 3D data is reproduced. Therefore, the present invention determines that the boundary occlusion region exists using a 3D parameter (OcclusionDirection) existing in the 3D data to perform a post process on the relevant region, thereby reducing the user's visual fatigue.

According to the present invention, a 3D image (for example, a stereo image) obtained using a plurality of cameras can be effectively stored, and stored 3D related parameters can be used for contents sharing and reproduction between various 3D devices.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for generating three dimensional (3D) data in a mobile terminal, the apparatus comprising:
a camera unit for obtaining a plurality of image data capable of providing a 3D effect; and a 3D data manager for obtaining a start address of a block where each image data is to be stored and a 3D parameter in order to separate and store the obtained image data, compressing the obtained image data, and generating the compressed data, the 3D parameter, and the start address of the block as one file.

2. The apparatus of claim 1, wherein the 3D parameter of the obtained image data comprises at least one of the number of visual points (NumofStereoPair) included in the data, an index (PairedViewID[ ]) of a visual point forming a Stereo Pairing with a current visual point, a width of a boundary occlusion region (BoundaryOcclusionWidth) of the current visual point compared to a reference visual point, and a direction (Occlusion Direction) where a boundary occlusion region occurs.

3. An apparatus for reproducing three dimensional (3D) data in a mobile terminal, the apparatus comprising:
a processor configured to implement a 3D data manager for reading a start address of a block where image data for at least two visual points are separated and stored, analyzing a parameter of 3D data to reproduce in each block of the start address, determining a visual point included in the 3D data using the analyzed parameter, and reproducing the determined visual point to provide a 3D effect.

4. The apparatus of claim 3, wherein the 3D data manager analyzes at least one of the number of visual points (NumofStereoPair) included in the 3D data, an index (PairedViewID[ ]) of a visual point forming a Stereo Pairing with a current visual point, a width of a boundary occlusion region (BoundaryOcclusionWidth) of the current visual point compared to a reference visual point, and a direction (Occlusion Direction) where a boundary occlusion region occurs to analyze a 3D parameter of the 3D data to reproduce in each block of the start address.

5. The apparatus of claim 3, wherein the 3D data manager increases a user's a 3D effect depending on a size of a display, or reduces a user's visual fatigue depending on the size of the display to reproduce the determined visual point and provide the 3D effect.

6. The apparatus of claim 5, wherein when the size of the display is small, the 3D data manager reproduces data of an auxiliary visual point whose disparity with a reference visual point is long to increase a user's 3D effect depending on the size of the display.

7. The apparatus of claim 5, wherein when the size of the display is large, the 3D data manager reproduces data of an auxiliary visual point whose disparity with a reference visual point is short to reduce a user's visual fatigue depending on the size of the display.

8. The apparatus of claim 3, wherein the 3D data manager removes a boundary occlusion region to reduce a user's visual fatigue and reproduces the determined visual point to provide a 3D effect.

9. The apparatus of claim 8, wherein the 3D data manager determines a direction of the boundary occlusion region included in data providing a 3D effect and a width of the boundary occlusion region, and performs a post process on the determined boundary occlusion region to remove the boundary occlusion region, thereby reducing a user's visual fatigue.

10. A method for generating three dimensional (3D) data in a mobile terminal, the method comprising:
obtaining image data for a plurality of visual points capable of providing a 3D effect;
determining a start address of a block where each image data is to be stored in order to separate and store the obtained image data;
obtaining a 3D parameter of the obtained image data; and
after compressing the obtained image data, generating the compressed data, the 3D parameter, and the start address of the block as one file.

11. The method of claim 10, wherein the 3D parameter of the obtained image data comprises at least one of the number of visual points (NumofStereoPair) included in the data, an index (PairedViewID[ ]) of a visual point forming a Stereo Pairing with a current visual point, a width of a boundary occlusion region (BoundaryOcclusionWidth) of the current visual point compared to a reference visual point, and a direction (Occlusion Direction) where a boundary occlusion region occurs.

12. A method for reproducing three dimensional (3D) data in a mobile terminal, the method comprising:
using a processor to perform each of,
reading a start address of a block where image data for at least two visual points are separated and stored;
analyzing a parameter of 3D data to reproduce in each block of the start address;
determining a visual point included in the 3D data using the analyzed parameter; and
reproducing, on a display of the mobile terminal, the determined visual point to provide a 3D effect.

13. The method of claim 12, wherein the analyzing of the parameter of 3D data to reproduce in each block of the start address comprises: analyzing at least one of the number of visual points (NumofStereoPair) included in the 3D data, an index (PairedViewID[ ]) of a visual point forming a Stereo Pairing with a current visual point, a width of a boundary occlusion region (BoundaryOcclusionWidth) of the current visual point compared to a reference visual point, and a direction (Occlusion Direction) where a boundary occlusion region occurs.

14. The method of claim 12, wherein the reproducing of the plurality of visual points to provide the 3D effect comprises:

increasing a user's 3D effect depending on a size of a display; and reducing a user's visual fatigue depending on the size of the display.

15. The method of claim 14, wherein the increasing of the user's 3D effect depending on the size of the display comprises: when the size of the display is small, reproducing data of an auxiliary visual point whose disparity with a reference visual point is long to increase the 3D effect.

16. The method of claim 14, wherein the reducing of the user's visual fatigue depending on the size of the display comprises: when the size of the display is large, reproducing data of an auxiliary visual point whose disparity with a reference point is short to reduce a visual fatigue.

17. The method of claim 12, wherein the reproducing of the plurality of visual points to provide the 3D effect comprises: removing a boundary occlusion region to reduce a user's visual fatigue.

18. The method of claim 17, wherein the removing of the boundary occlusion region to reduce the user's visual fatigue comprises: determining a direction and a width of a boundary occlusion region included in data that provides a 3D effect; and performing a post process for reducing a visual fatigue on the determined boundary occlusion region.

* * * * *